(12) United States Patent
Ishibashi et al.

(10) Patent No.: US 9,080,627 B2
(45) Date of Patent: Jul. 14, 2015

(54) STOPPER WITH DAMPER

(75) Inventors: Kouichirou Ishibashi, Tsukubamirai (JP); Seiji Takanashi, Tsukubamirai (JP); Motohiro Sato, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 606 days.

(21) Appl. No.: 13/010,120

(22) Filed: Jan. 20, 2011

(65) Prior Publication Data

US 2011/0180979 A1    Jul. 28, 2011

(30) Foreign Application Priority Data

Jan. 28, 2010   (JP) .................................. 2010-016984

(51) Int. Cl.
*F16F 1/36*     (2006.01)
*F16F 9/02*     (2006.01)

(52) U.S. Cl.
CPC ..................................... *F16F 9/0218* (2013.01)

(58) Field of Classification Search
CPC ............... F16F 1/36; F16F 1/37; F16F 1/445; F16F 2236/045; F16F 9/0218
USPC .............. 267/71, 137, 140, 140.13, 141, 153; 188/268
See application file for complete search history.

(56) References Cited

U.S. PATENT DOCUMENTS

| | | | | | |
|---|---|---|---|---|---|
| 2,443,201 | A | * | 6/1948 | Sluyter | 267/153 |
| 2,460,116 | A | * | 1/1949 | Bazley | 267/134 |
| 3,039,757 | A | * | 6/1962 | Barr | 267/140 |
| 4,591,030 | A | * | 5/1986 | Antkowiak | 188/268 |
| 5,884,549 | A | | 3/1999 | Hosono et al. | |
| 6,857,624 | B2 | * | 2/2005 | Landry, Jr. | 267/153 |
| 6,974,002 | B2 | * | 12/2005 | Heideman | 188/285 |
| 2002/0170794 | A1 | * | 11/2002 | Dubach | 188/381 |
| 2009/0032243 | A1 | * | 2/2009 | Victor | 166/84.2 |

FOREIGN PATENT DOCUMENTS

| | | | | |
|---|---|---|---|---|
| DE | 2400176 A1 | * | 7/1975 | F16F 1/37 |
| DE | 29915756 U1 | * | 11/1999 | F16F 1/373 |
| JP | 10-61611 | | 3/1998 | |

* cited by examiner

*Primary Examiner* — Bradley King
*Assistant Examiner* — Stephen Bowes
(74) *Attorney, Agent, or Firm* — Oblon, McClelland, Maier & Neustadt, L.L.P.

(57) ABSTRACT

A damper hole having a large-diameter section is formed inside a body which is made of metal. A flange which fits in the large-diameter section is formed in a damper which is made of rubber and is received in the damper hole. The flange defines a cushion chamber in the large-diameter section. A gap for letting air restrictively discharge from the cushion chamber is formed between an outer periphery of the flange and an inner periphery of the large-diameter section. Motion energy of a moving object colliding with the damper is absorbed by both elasticity produced by the compressed damper and an air cushion effect produced by the flange and the cushion chamber.

11 Claims, 3 Drawing Sheets

STOPPER WITH DAMPER

BACKGROUND OF THE INVENTION

[1]. Field of the Invention

The present invention relates to a stopper with a damper which causes a moving object to collide with a damper and stop in a buffered manner.

[2]. Description of the Related Art

In automatic machines for processing and assembly of a work, a linear actuator described in, for example, the Patent Document, Japanese Unexamined Patent Application Publication No. 10-61611, is generally used as a conveyor means for the work. The linear actuator includes a base which incorporates an air cylinder mechanism, and a table which reciprocates linearly on the base. The table is connected to the air cylinder mechanism. As the table is driven to reciprocate by the air cylinder mechanism, the work is conveyed by the table.

The linear actuator includes a stopper with a damper to stop the table in a buffered manner at a stroke end. As illustrated in FIG. 8, this stopper 30 includes a damper hole 32 formed inside a cylindrical body 31 which is provided with an external thread 31a on its outer periphery. A damper 33 made of rubber is received in the damper hole 32 with a front end thereof protruding outward. The body 31 is screwed into a screw hole 34a of an attachment section 34 provided on a side surface of the base, and is fixed to the attachment section 34 with a nut which is screwed on the body 31.

The damper 33 is compressed when a stop block 35 fixed to a side surface of the table is caused to collide with the damper 33. Motion energy of the table is absorbed by elasticity of the compressed damper 33.

The related art stopper, however, absorbs the motion energy of a moving object only by elasticity upon compression of the damper 33. Thus, an energy absorption amount is small and shock-absorbing property is insufficient. In addition, the damper easily becomes inelastic when the damper is repeatedly extended and contracted. Thus, durability is also insufficient.

SUMMARY OF INVENTION

The present invention has been made to overcome the related art problems described above, and an object thereof is to provide a stopper with a damper that is capable of efficiently absorbing motion energy of a moving object and that is excellent in shock-absorbing property and durability.

In order to achieve the object, a stopper with a damper of the present invention is constituted by a body which is made of metal, a damper hole formed inside the body from a front side of the body and the damper made of rubber received in the damper hole.

The body includes a contact section on a front surface thereof with which the moving object is brought into contact at a stop position. The damper hole includes a large-diameter section with an increased diameter at a position further toward an interior of the hole than an opening of the hole. The damper is disposed with a front end thereof protruding outward from the damper hole and with a rear end thereof being in contact with a bottom of the hole of the damper hole. The damper includes a circular flange on an outer periphery of the damper between the front end and the rear end. The flange fits in the large-diameter section. The flange defines a cushion chamber in the large-diameter section. A gap is formed between an outer periphery of the flange and an inner periphery of the large-diameter section. The gap lets air in the cushion chamber flow restrictively when the damper is compressed and the flange is displaced within the large-diameter section.

It is preferred in the present invention that a length A of a protruding section of the damper protruding from the damper hole, a length B of the flange and a length C of the large-diameter section of the damper hole are in a relationship of A+B≤C.

In order to prevent buckling of the damper, a circular support section is formed at a portion of an outer periphery of the damper or at a portion of an inner periphery of the damper hole. The support section causes the outer periphery of the damper and the inner periphery of the damper hole to be close to or in contact with each other.

The support section is formed at a portion of the damper between the flange and a rear end of the damper, or at a portion of the damper hole between the large-diameter section and a bottom of the hole.

In the present invention, it is preferred that a base section having an increased diameter is formed at the rear end of the damper and the base section is in contact with the bottom of the hole of the damper hole.

The flange is formed at a position further toward the front end of the damper than a center of the damper and a length from a rear end of the flange to the rear end of the damper is longer than a length from a front end of the flange to the front end of the damper.

The large-diameter section is formed at a position further toward an opening of the hole than a center of the damper hole, and the length of the large-diameter section is longer than the length of an opening side portion of the hole between the front end of the large-diameter section and the opening of the hole and is shorter than the length of an interior side portion of the hole between a rear end of the large-diameter section and a bottom of the hole.

The stopper with a damper of the present invention absorbs motion energy of the moving object by both elasticity of the damper and an air cushion and is therefore excellent in shock-absorbing property and durability. After motion energy is absorbed by the damper, the moving object is brought into contact with the contact section of the body which is made of metal and is stopped. Thus, positioning accuracy of the stop position is high.

DESCRIPTION OF THE PREFERRED EMBODIMENT

Figure 1:
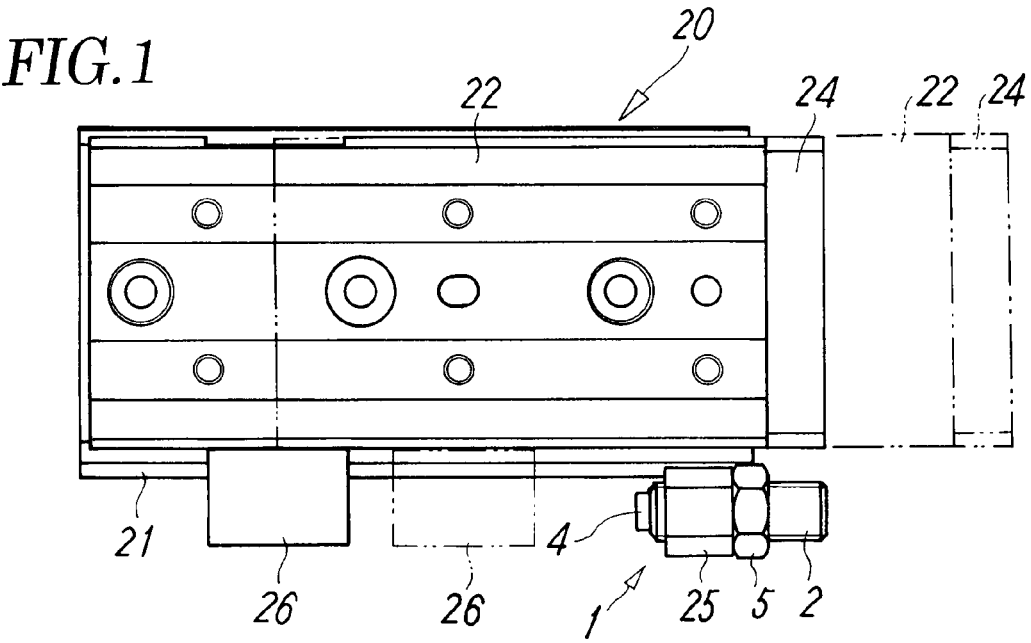
FIG. 1 is a plan view of a linear actuator which incorporates a stopper with a damper according to the invention.
Figure 2:
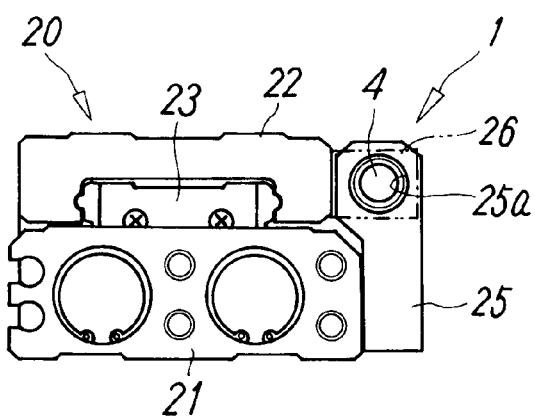
FIG. 2 is a left side view of FIG. 1.

FIGS. 1 and 2 illustrate a linear actuator 20 which incorporates a stopper 1 with a damper according to the invention.

The linear actuator 20 includes a base 21 and a table 22. The base 21 incorporates an air cylinder mechanism and has a rectangular shape when seen in a plan view. The table 22 reciprocates linearly along a rail 23 on the base 21 in a horizontal direction of FIG. 1 and has a rectangular shape when seen in a plan view. A piston rod (not illustrated) of the air cylinder mechanism extends from one longitudinal end of the base 21. A connecting plate 24 is attached to a distal end of the piston rod. The connecting plate 24 is connected with one end of the table 22. The table 22 is driven to reciprocate by the air cylinder mechanism via the connecting plate 24 such that a work is conveyed by the table 22.

Since a structure of such a linear actuator 20 is already known, detailed description thereof will be omitted.

Figure 3:
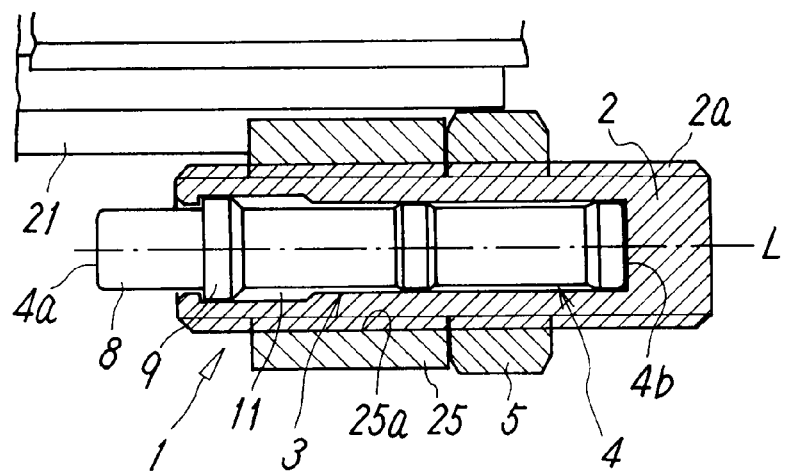
FIG. 3 is an enlarged sectional view of the stopper with a damper illustrated in FIG. 1.

The stopper 1 with a damper (hereinafter, simply referred to as a "stopper") is attached to the base 21 in order to stop the table 22 in a buffered manner at a forward stroke end as the table 22 is moved to the right as illustrated by a chain line in FIG. 1. As is apparent from FIG. 3, the stopper 1 is constituted by a cylindrical body 2 and a damper 4. The body 2 includes an external thread 2a on its outer periphery. The damper 4 is made of rubber and is received in a damper hole 3 inside the body 2 with a front end 4a thereof protruding from the damper hole 3. The stopper 1 is attached to the base 21 with the body 2 being screwed into a screw hole 25a of a attachment section 25 formed on a side surface of the base 21 and being fixed to the body 2 with a nut 5 which is screwed into the body 2.

When a stop block 26 attached to a side surface of the table 22 collides with the front end 4a of the damper 4, the damper 4 is compressed in the direction of an axis L of the damper hole 3. With this, motion energy of the table 22 is absorbed and the table 22 stops in a buffered manner at the stroke end. At this time, a portion of the damper 4 protruding from the body 2, i.e., a protruding section 8, is completely crushed inside the body 2. Thus, the stop block 26 is brought into contact with a front surface of the body 2 and stops at that position.

A structure and an operation of the stopper 1 will be described in detail below. As is apparent from FIGS. 3 and 4, the stopper 1 includes the body 2 which is made of metal, such as stainless steel. The damper hole 3 is formed in the body 2 from a front side of the body 2 so as not to penetrate the body 2. The damper 4 is received in the damper hole 3.

A planar section surrounding an opening of the hole 3a of the damper hole 3 on the front surface of the body 2 is formed as a circular contact section 6 with which the stop block (hereinafter, referred to as a "moving object") 26 is brought into contact. After compressing the damper 4, the moving object 26 is brought into contact with the contact section 6 and is stopped.

The damper hole 3 is formed as a circular hole including a large-diameter section 3c which is increased in diameter at a position slightly further toward the interior of the hole than the opening of the hole 3a. The damper hole 3 includes an opening side portion of the hole 3d and an interior side portion of the hole 3e of the same diameter at both sides of the large-diameter section 3c, i.e., at the side of the opening of the hole 3a and the side of the bottom of the hole 3b. In the illustrated example, a length C of the large-diameter section 3c along the axis L is longer than the length of the opening side portion of the hole 3d but is shorter than the length of the interior side portion of the hole 3e. However, the relationship among the lengths of these components 3c, 3d and 3e is not limited to the same.

The damper 4 is made of urethane rubber and has a cylindrical shape which is flexibly expandable and contractible. The damper 4 is received in the damper hole 3 with the front end 4a protruding outside from the damper hole 3 and a base section 7 at a rear end 4b being in contact with the bottom of the hole 3b of the damper hole 3. A diameter of a main body section of the damper 4, i.e., a diameter of the damper 4 except for the base section 7, a flange 9 and a support section 10, is smaller than the diameter of the damper hole 3. Therefore, a clearance O is formed between an outer periphery of the main body section of the damper 4 and an inner circumference of the damper hole 3 in accordance with the difference in diameter. The clearance O has a function to absorb an expanded portion of the damper 4 when the damper 4 is compressed in the direction of the axis L and expanded in a radial direction for a buffer operation.

A diameter of the base section 7 is larger than that of the main body section and is equal to or slightly smaller than that of the damper hole 3. With this, the base section 7 is closely fit into the interior side portion of the hole 3e.

The damper 4 includes the circular flange 9 integrated therewith between the front end 4a and the rear end 4b on the outer periphery of the damper 4. The flange 9 fits in the large-diameter section 3c of the damper hole 3. The flange 9 defines a cushion chamber 11 at the side of the interior of the hole of the large-diameter section 3c. When the damper 4 is in an initial position (i.e., a position of FIG. 4) before performing the buffer operation, the flange 9 engages with a front end wall 3f of the large-diameter section 3c and acts as a retainer for the stopper 1. When the moving object 26 collides with the damper 4 and the damper 4 is compressed in the direction of the axis L, the damper 4 is displaced within the large-diameter section 3c in a direction toward the interior of the hole, i.e., in a direction in which capacity of the cushion chamber 11 is reduced, as illustrated in FIG. 5. The damper 4 thus pressurizes air in the cushion chamber 11 to produce an air cushion effect. Thus, a small gap G is defined between the outer periphery of the flange 9 and the inner periphery of the large-diameter section 3c to discharge air from the cushion chamber 11 restrictively.

Thus, the flange 9 has the functions as an engaging member to retain the damper 4 and as a cushion piston to operate the air cushion. The diameter of the flange 9 is larger than that of the base section 7.

It is preferred in the damper 4 that the length of a section between the flange 9 and the rear end 4b (i.e., a rear end length) is longer than the length of a section between the front end 4a and the flange 9 (i.e., a front end length).

The damper 4 also includes the circular support section 10 which is formed by increasing the diameter of the damper 4 at a position between the flange 9 and the rear end 4b, i.e., a position at which the damper 4 fits in the interior side portion of the hole 3e of the damper hole 3. An outer periphery of the support section 10 is located close to or brought into contact with an inner periphery of the damper hole 3, thereby preventing buckling of the damper 4 at an intermediate portion thereof. The diameter of the support section 10 may be the same as that of the base section 7.

One or more support sections 10 may be provided. In order to prevent trapping of air within the clearance O by the support section 10 when the damper 4 performs the buffer operation, a groove or a hole for letting the trapped air escape may be formed along the direction of the axis L on the outer periphery of the support section 10.

In order that the moving object 26 can be brought into contact with the contact section 6 of the distal end of the body 2 at the stopping position, the relationship among the length A of the protruding section 8 of the damper 4 protruding from the damper hole 3, the length B of the flange 9 and the length C of the large-diameter section 3c of the damper hole 3 is determined to be A+B≤C.

Figure 4:
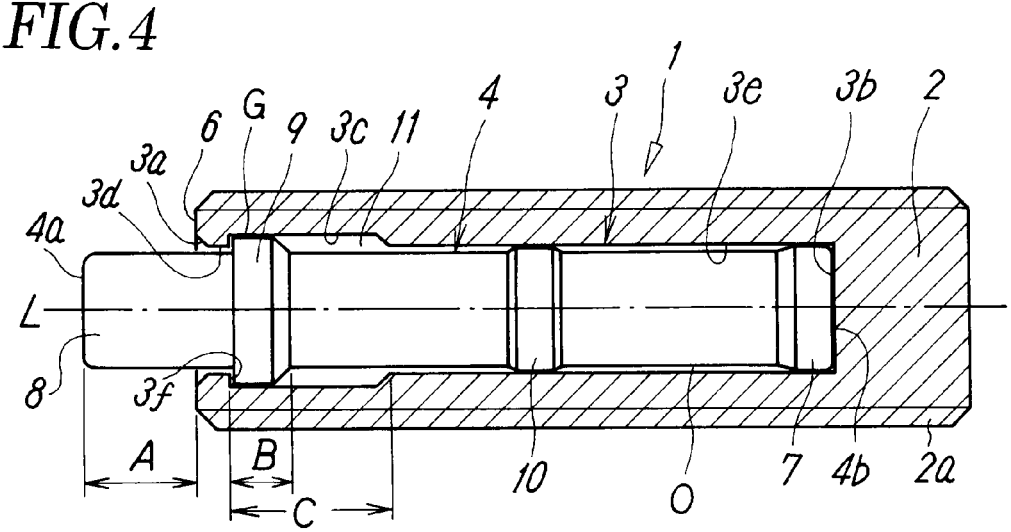
FIG. 4 is a partially enlarged view of FIG. 3.
Figure 5:
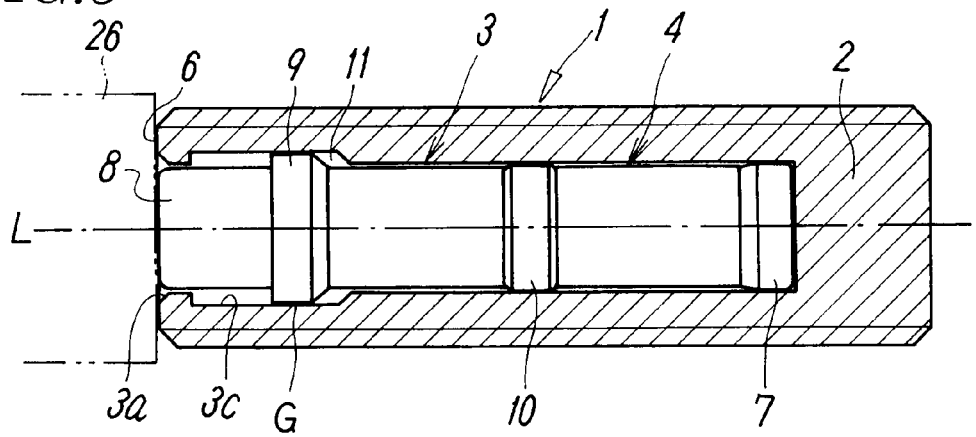
FIG. 5 is a sectional view illustrating an operating state of the damper of FIG. 4 upon collision of a moving object with the damper.

With the thus-structured stopper 1, when the moving object 26 collides with the front end 4a of the damper 4 in the state in which the damper 4 is located at the initial position of FIG. 4, the entire damper 4 is compressed in the direction of the axis L as illustrated in FIG. 5 and the motion energy of the moving object 26 is absorbed by the elasticity of the damper 4 caused by the compression and the air cushion effect produced by the flange 9.

That is, when the damper 4 is compressed, the flange 9 is displaced within the large-diameter section 3c of the damper hole 3 toward the direction of the interior of the hole, i.e., the direction in which the capacity of the cushion chamber 11 is reduced. At this time, the air in the cushion chamber 11 and in the clearance O communicating with the cushion chamber 11 is discharged toward the opening of the hole 3a at a restricted flow rate via the gap G on the outer periphery of the flange 9. With this, an air cushion effect is produced which, altogether with the elasticity effect of the damper 4, absorbs the motion energy of the moving object 26.

When the protruding section 8 of the damper 4 is pressed completely into the damper hole 3, the moving object 26 is brought into contact with the contact section 6 of the front end of the body 2 in a buffered manner and stops at that position. With this, since the position of the stroke end of the table 22 is defined accurately by the contact section 6, positioning accuracy of the stop position by the stopper is significantly increased. The damper 4 is supported by the support section 10 during the buffer operation and thus buckling thereof in the intermediate portion is prevented.

Note that the position of the stroke end of the moving object 26 can be controlled in FIG. 1 by causing the body 2 to move back and forth to adjust a fixing position with respect to the attachment section 25.

When the moving object 26 is moved backward and then the damper 4 is released from the moving object 26, the damper 4 is extended to return to the initial state of FIG. 4.

Figure 8:
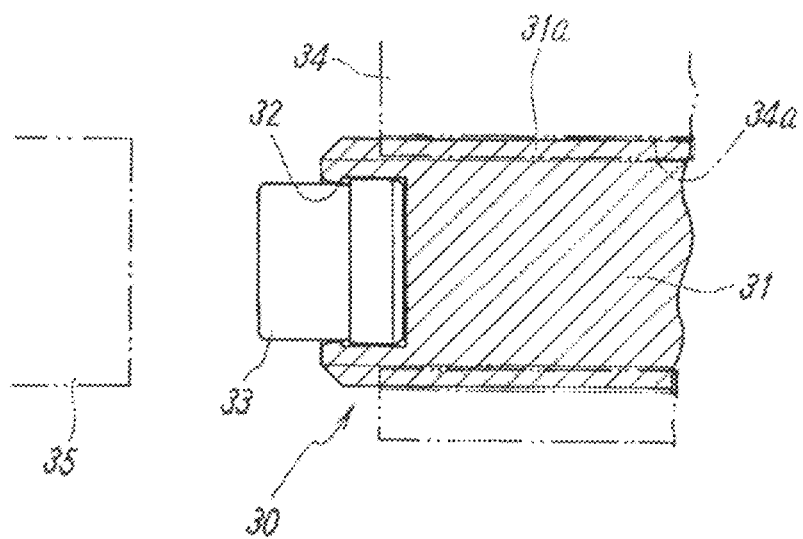
FIG. 8 is a sectional view of a main part of a related art stopper with a damper.

In the thus-structured stopper 1, as compared with the related art stopper illustrated in FIG. 8, the length of the entire damper 4 can be increased and the length of the protruding section 8 can be increased. Thus, the increased amount of energy absorption and the prolonged damper stroke altogether provide increased shock-absorbing property. In addition, since the motion energy of the moving object 26 is absorbed by both the elasticity of the damper 4 and the air cushion effect of the flange 9, the shock-absorbing property is increased. Since the damper 4 is not highly compressed, the damper 4 does not easily become inelastic and thus is highly durable.

Since the relationships among the length A of the protruding section 8 of the damper 4, the length B of the flange 9 and the length C of the large-diameter section 3c of the damper hole 3 is determined to be A+B≤C, the moving object 26 can be brought into contact with the contact section 6 of the front end of the body 2 in a buffered manner and can stop at that position with accuracy. Thus, positioning accuracy of the stop position is significantly high.

Figure 6:
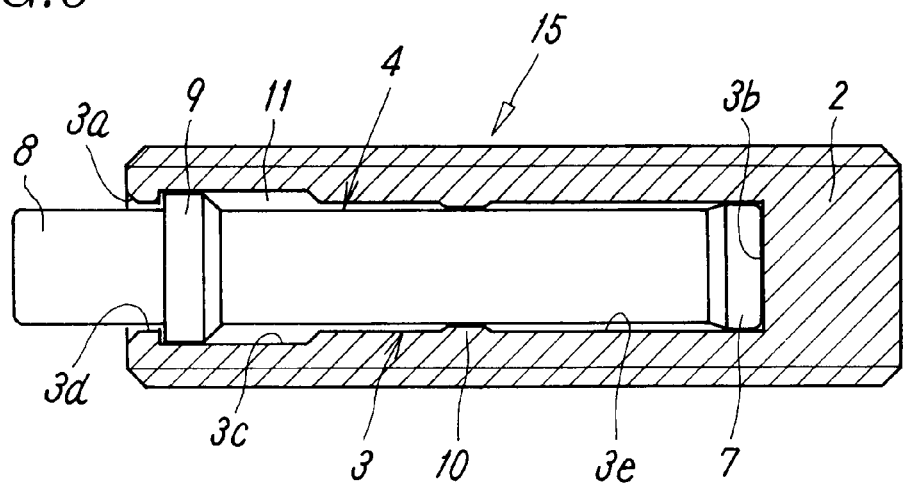
FIG. 6 is a sectional view of a main part illustrating a second embodiment of a stopper with a damper.

FIG. 6 illustrates a main part of a stopper 15 of a second embodiment. The stopper 15 differs from the stopper 1 of the first embodiment illustrated in FIGS. 4 and 5 in that a support section 10 for the prevention of buckling of the damper 4 is formed in a portion of an inner periphery of a damper hole 3.

That is, the support section 10 is formed in an intermediate position of an interior side portion of the hole 3e between a large-diameter section 3c of the damper hole 3 and a bottom of the hole 3b by decreasing a diameter of the interior side portion of the hole 3e. Thus, the damper 4 of the stopper 15 of the second embodiment includes no support section 10 that is formed in the damper 4 of the stopper 1 of the first embodiment.

Components of the second embodiment other than those described above are the same as those of the first embodiment. Thus, the main components those are the same of those of the first embodiment are denoted by the same reference numerals as those of the first embodiment and description thereof will be omitted.

Figure 7A:
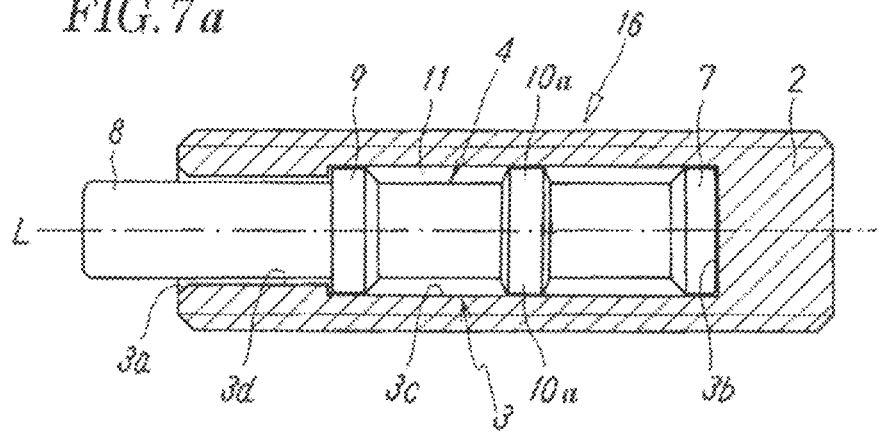
FIGS. 7a and 7b are sectional views of a main part according to a third embodiment of a stopper with a damper and a fourth embodiment, respectively.
Figure 7B:
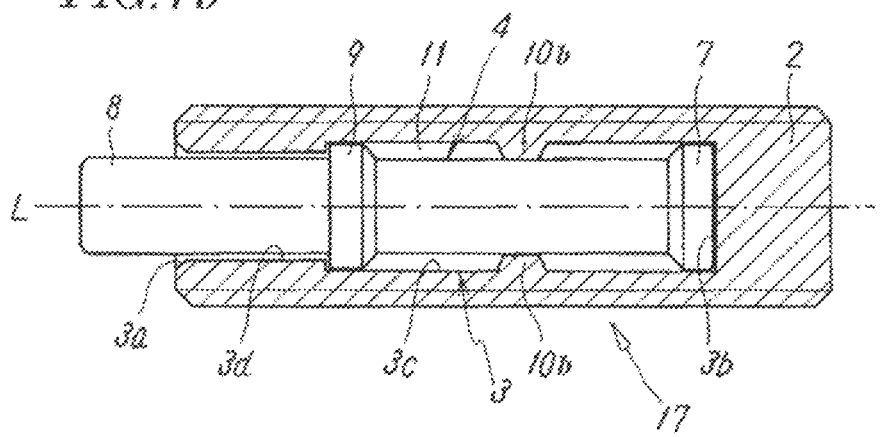

FIG. 7a illustrates a stopper 16 of a third embodiment and FIG. 7b illustrates a stopper 17 of a fourth embodiment. These stoppers 16 and 17 differ from the stopper 1 of the first embodiment in that a large-diameter section 3c of the damper hole 3 is extended to a bottom of the hole 3b of a damper hole 3 and the stoppers 16 and 17 have no interior side portion of the hole 3e that is provided in the damper hole 3 of the stopper 1 of the first embodiment.

In the stopper 16 of the third embodiment, a support section 10 for the prevention of buckling of a damper 4 is formed on an outer periphery of the damper 4. In the stopper 17 of the fourth embodiment, a support section 10 is formed on an inner periphery of the damper hole 3, i.e., an inner periphery of the large-diameter section 3c.

Components of the third and fourth embodiments other than those described above are the same as those of the first embodiment. Thus, the main components that are the same of those of the first embodiment are denoted by the same reference numerals as those of the first embodiment and description thereof will be omitted.

The invention claimed is:

1. A stopper with a damper which causes a moving object to collide with the damper to stop in a buffered manner, the stopper comprising:
    a body which is made of metal;
    a damper hole formed inside the body from a front side of the body; and
    the damper which is made of rubber and is accommodated in the damper hole,
    wherein the body includes a contact section at a front surface thereof, the moving object being brought into contact with the contact section at a stop position,
    wherein the damper hole includes a large-diameter section having a diameter that is larger than other sections of the damper hole, the large-diameter section being located on an interior side with respect to an opening of the hole,
    wherein the damper includes a front end of the damper protruding outward from the damper hole and a rear end of the damper being in contact with a bottom of the hole of the damper hole and the damper includes a circular flange on an outer periphery thereof between the front end of the damper and the rear end of the damper, the flange fitting in the large-diameter section,
    wherein the front end of the damper is integrally formed as a single body with the damper, the single body being made of rubber,
    wherein a cushion chamber is formed by the flange in the large-diameter section, and
    wherein a gap is formed between an outer periphery of the flange and an inner periphery of the large-diameter section, the gap letting air in the cushion chamber flow restrictively when the damper is compressed and the flange is displaced within of the large-diameter section,
    wherein, in order to prevent buckling of the damper, a circular support section is formed at a portion of an outer periphery of the damper or at a portion of an inner periphery of the damper hole, the support section causes the outer periphery of the damper and the inner periphery of the damper hole to be close to or in contact with each other.

2. The stopper according to claim 1, wherein the support section is formed at a portion of the damper between the flange and the rear end of the damper, or at a portion of the damper hole between the large-diameter section and the bottom of the hole.

3. The stopper according to claim 1, wherein a base section having an increased diameter is formed at the rear end of the damper and the base section comes into contact with the bottom of the hole of the damper hole.

4. The stopper according to claim 1, wherein the large-diameter section is formed at a position closer to the opening of the hole than a center of the damper hole, and
wherein a length of the large-diameter section is longer than a length of an opening side portion of the hole between a front end of the large-diameter section and the opening of the hole and is shorter than a length of an interior side portion of the hole between a rear end of the large-diameter section and a bottom of the hole.

5. The stopper according to claim 1, wherein the flange is formed at a position closer to a front end of the damper than a center of the damper, and
wherein a length from a rear end of the flange to the rear end of the damper is longer than a length from a front end of the flange to the front end of the damper.

6. The stopper according to claim 5, wherein the large-diameter section is formed at a position closer to the opening of the hole than a center of the damper hole, and
wherein a length of the large-diameter section is longer than a length of an opening side portion of the hole between a front end of the large-diameter section and the opening of the hole and is shorter than a length of an interior side portion of the hole between a rear end of the large-diameter section and a bottom of the hole.

7. The stopper according to claim 1, wherein a length A of a protruding section of the damper protruding from the damper hole, a length B of the flange and a length C of the large-diameter section of the damper hole are in a relationship of $A+B \leq C$.

8. The stopper according to claim 7, wherein the support section is formed at a portion of the damper between the flange and the rear end of the damper, or at a portion of the damper hole between the large-diameter section and the bottom of the hole.

9. The stopper according to claim 7, wherein the large-diameter section is formed at a position closer to the opening of the hole than a center of the damper hole, and
wherein a length of the large-diameter section is longer than a length of an opening side portion of the hole between a front end of the large-diameter section and the opening of the hole and is shorter than a length of an interior side portion of the hole between a rear end of the large-diameter section and a bottom of the hole.

10. The stopper according to claim 7, wherein the flange is formed at a position closer to a front end of the damper than a center of the damper, and
wherein a length from a rear end of the flange to the rear end of the damper is longer than a length from a front end of the flange to the front end of the damper.

11. The stopper according to claim 10, wherein the large-diameter section is formed at a position closer to the opening of the hole than a center of the damper hole, and
wherein a length of the large-diameter section is longer than a length of an opening side portion of the hole between a front end of the large-diameter section and the opening of the hole and is shorter than a length of an interior side portion of the hole between a rear end of the large-diameter section and a bottom of the hole.

* * * * *